United States Patent
Mizuno et al.

(10) Patent No.: US 10,153,470 B2
(45) Date of Patent: Dec. 11, 2018

(54) POLYOLEFIN POROUS MEMBRANE, BATTERY SEPARATOR OBTAINED USING SAME, AND METHOD OF PRODUCING SAME

(71) Applicant: TORAY INDUSTRIES, INC., Tokyo (JP)

(72) Inventors: Naoki Mizuno, Nasushiobara (JP); Koichi Matano, Nasushiobara (JP)

(73) Assignee: TORAY INDUSTRIES, INC., Tokyo (JP)

( * ) Notice: Subject to any disclaimer, the term of this patent is extended or adjusted under 35 U.S.C. 154(b) by 79 days.

(21) Appl. No.: 14/771,165

(22) PCT Filed: Feb. 12, 2014

(86) PCT No.: PCT/JP2014/053126
§ 371 (c)(1),
(2) Date: Aug. 27, 2015

(87) PCT Pub. No.: WO2014/132791
PCT Pub. Date: Sep. 4, 2014

(65) Prior Publication Data
US 2016/0013461 A1    Jan. 14, 2016

(30) Foreign Application Priority Data
Feb. 27, 2013 (JP) .................................. 2013-036657

(51) Int. Cl.
H01M 2/14 (2006.01)
H01M 2/16 (2006.01)
(Continued)

(52) U.S. Cl.
CPC ....... H01M 2/1653 (2013.01); B29C 37/0025 (2013.01); B29C 47/0004 (2013.01);
(Continued)

(58) Field of Classification Search
CPC ......... C08J 5/18; C08J 7/047; B29C 47/0021; B29C 47/06; B29C 47/88; B29C 47/0057;
(Continued)

(56) References Cited

U.S. PATENT DOCUMENTS

2005/0019665 A1    1/2005  Adachi et al.
2007/0023290 A1*   2/2007  Hawkins .............. B01D 61/445
                                                     204/520
(Continued)

FOREIGN PATENT DOCUMENTS

EP    2551293 A1    1/2013
JP    06-240036 A   8/1994
(Continued)

OTHER PUBLICATIONS

International Search Report dated May 27, 2014, for International Application No. PCT/JP2014/053126, 2 pages.

*Primary Examiner* — Muhammad S Siddiquee
(74) *Attorney, Agent, or Firm* — Kilpatrick Townsend and Stockton LLP

(57) ABSTRACT

A polyolefin porous membrane disclosed. The membrane includes a plurality of protrusions of polyolefin having a size (W) of 5 μm≤W≤50 μm and a height (H) of 0.5 μm≤H. The protrusions are disposed on one side of the polyolefin porous membrane with a density of at least 3/cm² and at most 200/cm², and the polyolefin porous membrane has a thickness of at most 20 μm. A battery separator including the membrane is also disclosed.

7 Claims, 4 Drawing Sheets

(51) Int. Cl.
    *B29C 37/00* (2006.01)
    *B29C 47/00* (2006.01)
    *B29C 47/06* (2006.01)
    *H01M 10/0525* (2010.01)
    *C08J 5/18* (2006.01)
    *C08J 7/04* (2006.01)
    *B29C 47/88* (2006.01)
    *B29K 105/04* (2006.01)
    *B29L 9/00* (2006.01)
    *B29L 31/34* (2006.01)

(52) U.S. Cl.
    CPC ...... B29C 47/0021 (2013.01); B29C 47/0057 (2013.01); B29C 47/06 (2013.01); C08J 5/18 (2013.01); C08J 7/047 (2013.01); H01M 2/145 (2013.01); H01M 10/0525 (2013.01); *B29C 47/8845* (2013.01); *B29C 47/8895* (2013.01); *B29K 2023/06* (2013.01); *B29K 2105/04* (2013.01); *B29K 2995/0007* (2013.01); *B29L 2009/005* (2013.01); *B29L 2031/3468* (2013.01); *C08J 2323/06* (2013.01); *C08J 2427/16* (2013.01)

(58) Field of Classification Search
    CPC ............ B29C 47/0004; B29C 37/0025; B29C 47/8895; H01M 2/145; H01M 10/0525; H01M 2/1653; B29K 2105/04; B29K 2995/0007; B29L 2031/3468; B29L 2009/005

See application file for complete search history.

(56) References Cited

U.S. PATENT DOCUMENTS

2007/0231887 A1* 10/2007 McGrath ................. B01L 3/502
                                                                              435/1.1
2010/0129720 A1* 5/2010 Sako ................... H01M 2/1653
                                                                              429/246
2010/0209745 A1   8/2010  Kimishima
2010/0285348 A1  11/2010  Murata et al.

FOREIGN PATENT DOCUMENTS

| JP | 2003/003006 A | 1/2003 |
| --- | --- | --- |
| JP | 2004-83866 A | 3/2004 |
| JP | 2005-162773 A | 6/2005 |
| JP | 2009148997 A | 7/2009 |
| JP | 2010-0537845 A | 12/2010 |
| JP | 2011-0126184 A | 6/2011 |
| JP | 2012-43762 A | 3/2012 |
| JP | 2012/144663 A | 8/2012 |
| WO | 2004/020511 A1 | 3/2004 |
| WO | 2006/106783 A1 | 10/2006 |
| WO | 2008/053898 A1 | 5/2008 |
| WO | WO 2009/044227 A1 | 4/2009 |

* cited by examiner

POLYOLEFIN POROUS MEMBRANE, BATTERY SEPARATOR OBTAINED USING SAME, AND METHOD OF PRODUCING SAME

TECHNICAL FIELD

This application is a United States National Phase Application of co-pending International Patent Application Number PCT/JP2014/053126, filed Feb. 12, 2014 and entitled "POROUS POLYOLEFIN FILM, BATTERY SEPARATOR OBTAINED USING SAME, AND PROCESSES FOR PRODUCING THESE", which Application claims priority to Japanese Patent Application Number 2013-036657, filed with the Japanese Patent Office on Feb. 27, 2013, the contents of which are incorporated herein by reference in their entirety.

The present invention relates to a polyolefin porous membrane that is suitable for laminating a modified porous layer and a battery separator. The battery separator is useful as a lithium-ion battery separator.

BACKGROUND ART

Thermoplastic resin microporous membranes are used widely as a material for separation, selective transmission and isolation of substances and the like. For example, the usage includes battery separators for lithium ion rechargeable batteries, nickel-metal hydride batteries, nickel-cadmium batteries, or polymer batteries, separators for electric double layer capacitors, various filters such as reverse osmosis filtration membrane, ultrafiltration membrane, microfiltration membrane and the like, moisture permeation waterproof clothes, medical materials and the like. Especially, polyethylene porous membranes are preferably used as separators for lithium ion rechargeable batteries. This is because the membrane exhibits ion permeability due to electrolytic solution impregnation and possesses not only electrical insulating properties, electrolytic solution resistance, and anti-oxidation properties, but also pore blocking characteristics (shut-down characteristics), which block the electrical current to prevent excessive temperature increase at the temperature range from about 120 to 150° C. in abnormal temperature increase in batteries. However, if the temperature continues to increase even after the pore blocking for some reason, the decrease in viscosity of the polyethylene that configures the membrane and the shrinkage of the membrane may lead to membrane puncture at a certain temperature.

Especially, separators for lithium-ion batteries greatly affect battery characteristics, battery productivity and battery safety, and require good mechanical properties, heat resistance, permeability, dimensional stability, shut-down characteristics, membrane melt-puncture characteristics (melt-down characteristics) and the like. Furthermore, they require improved adhesion with an electrode material for improvement in cycle characteristics of batteries and improved wettability toward electrolytic solution for productivity improvement. To improve these functions, lamination of various modified porous layers on a porous membrane has been studied previously. As modified porous layers, polyamideimide resin, polyimide resin, and polyamide resin, which have both good heat resistance and good wettability toward electrolytic solution, and/or fluorine-based resin, which exhibits good adhesion toward electrodes are preferably used. A modified porous layer described in the present invention refers to a layer that includes resin, which provides or improves at least one of the functions among heat resistance, adhesion with an electrode material, wettability toward electrolytic solution and the like.

Furthermore, it is necessary to increase the area not only of an electrode but also of a separator to fill a container in order to increase battery capacity Therefore the decrease in thickness of the separator is expected. However, since the thinner porous membrane may experience deformation in its planer directions, a modified porous layer laminated on a thin porous membrane in a battery separator may delaminate during processing, the slit process, or the battery assembly process and the safety may be compromised.

In addition, significant reduction in battery assembly process time is expected to facilitate cost reduction. Therefore the improvement in adhesion, which can withstand such a high-speed process with few problems such as delamination of modified porous layers, is required. However, when the resin included in the modified porous layer is sufficiently permeated into the polyolefin porous membrane, which is a substrate, in order to improve the contact, large increase in air permeation resistance has been problematic.

CITATION LIST

Patent Literature

In Patent Document 1, polyvinylidene fluoride is coated on a 9 μm thick polyethylene porous membrane, and a fraction of polyvinylidene fluoride resin penetrates into micropores of the polyethylene porous membrane to exhibit anchor effect. The resultant composite porous membrane with a peel strength (T-peel strength) of 1.0 to 5.3 N/25 mm at the interface between the polyethylene porous membrane and the polyvinylidene fluoride coating layer is disclosed.

In Patent Document 2, a heat-resistant porous layer, which contains acrylic resin and N-vinyl acetamide polymer or thickener of water soluble cellulose derivative and plate-like boehmite, is disposed on a 16 μm thick, corona-discharge treated polyethylene porous membrane. The resultant separator with a 180° peel strength (T-peel strength) of 1.1 to 3.0 N/10 mm at the interface between the polyethylene porous membrane and the heat-resistant porous layer is disclosed.

In Patent Document 3, the method of producing a porous membrane is disclosed, in which polyethylene solution that comprises 30 wt. % of polyethylene composition (20 wt. % of high molecular weight polyethylene (UHMWPE) with a weight average molecular weight of $2.0 \times 10^6$, 80 wt. % of high density polyethylene (HDPE) with a weight average molecular weight of $3.5 \times 10^5$, and antioxidant) and 70 wt. % of liquid paraffin are extruded from an extruder at 190° C., and the extrudate is wound by a chill-roll kept at 50° C. The resultant gel-like product is stretched biaxially to the magnification of 5×5, and the porous membrane is obtained.

In Patent Document 4, the method of producing a microporous membrane is disclosed, in which polyethylene solution similar to that in Patent Document 3 is extruded from an extruder, and the extrudate is wound by a chill-roll kept at 0° C. The resultant gel-like product is stretched biaxially to the magnification of 5×5, and the microporous membrane is obtained.

In Working Example 1 of Patent Document 5, polyethylene solution that comprises 50 mass % of composition (47.5 mass % of polyethylene with a viscosity-average molecular weight of 200,000, 2.5 mass % of polypropylene with a viscosity-average molecular weight of 400,000 and antioxidant) and 50 mass % of liquid paraffin is extruded from an extruder at 200° C. and the extrudate is wound by a chill-roll kept at 25° C. The resultant gel-like product is stretched biaxially to the magnification of 7×6.4, and a polyolefin resin porous membrane is obtained. A multi-layer porous membrane obtained by laminating a coating layer that comprises polyvinylalcohol and alumina particles on the surface of the polyolefin resin porous membrane is disclosed.

In Working Example 6 of Patent Document 6, polyethylene solution that comprises 30 wt. % of polyethylene composition (weight average molecular weight of 4,150,000, weight average molecular weight of 560,000, and weight ratio of 1:9, respectively) and 70 wt. % of solvent mix of liquid paraffin and decalin is extruded from an extruder at 148° C. and the extrudate is cooled in water bath. The resultant gel-like product is stretched biaxially to the magnification of 5.5×11.0, and a polyethylene porous membrane is obtained. A non-water-based separator for a rechargeable battery obtained by laminating a coating layer that comprises meta-type wholly aromatic polyamide and alumina particles on the surface of the polyethylene porous membrane is disclosed.

In Patent Document 7, a polyolefin microporous membrane with an embossed pattern of diagonal lattices obtained by passing a gel sheet before stretching between an embossing roll and a back-up roll is disclosed.

Patent Document 1: Japanese Unexamined Patent Application Publication No. 2012-043762A
Patent Document 2: Re-publication of PCT International Publication No. 2010-104127A
Patent Document 3: Japanese Unexamined Patent Application Publication No. 2003-003006A
Patent Document 4: Japanese Unexamined Patent Application Publication No. 2004-083866A
Patent Document 5: Japanese Patent No. 4931083B
Patent Document 6: Japanese Patent No. 4460028B
Patent Document 7: WO/2008/053898

SUMMARY OF INVENTION

Technical Problem

These conventional arts, however, will not sufficiently ensure safety due to partial delamination of the modified porous layers during slit process or battery assembly process, when it is expected to speed up the manufacturing processes and to provide thinner separators, as anticipated by the lower cost and higher capacity in the near future. Especially when the polyolefin resin porous membrane, which is a substrate, becomes thinner, it will become more difficult to ensure safety sufficiently since it is more difficult to achieve enough anchoring of modified porous layers to polyolefin resin porous membrane.

Considering that battery separators will require further thinner materials and lower costs in the future, an object of the present invention is to provide a polyolefin porous membrane with exceptionally high peel strength against a modified porous layer, suitable for high-speed processing during slit process and battery assembly process, and suitable for laminating on a modified porous layer, and a battery separator obtained by laminating a modified porous layer on a polyolefin porous membrane with exceptionally high peel strength against a modified porous layer, and suitable for high-speed processing during slit process and battery assembly process.

Peel strength between a polyolefin porous membrane and a modified porous layer in a separator, referred in the present disclosure, is a value obtained from the measurement described below (in some cases, it is also referred to as 0° peel strength).

FIG. 1 is a schematic side view of a laminated sample of a polyolefin porous membrane and a modified porous layer under tension provided by a tensile tester (not illustrated). Reference numeral 1 denotes a laminated sample, 2 denotes a polyolefin porous membrane, 3 denotes a modified porous layer, 4 denotes a double-sided adhesive tape, 5 and 5' denote aluminum plates, and the arrow in the figure indicates the direction of tensile force. On the aluminum plate (5), 50 mm×25 mm in size and 0.5 mm in thickness, the double-sided adhesive tape (4) of the same size is adhered. The surface of the polyolefin porous membrane (2) side of the sample (the battery separator), cut out in the size of 50 mm in width and 100 mm in length, is adhered on the aluminum plate (5), so that the 40 mm portion of the sample, measured from one of the 25 mm long edges of the aluminum plate (5), is overlapped and adhered together, while the protruded portion is cut out. Next, a double-sided adhesive tape is adhered on one side of the aluminum plate (5'), 100 mm in length, 15 mm in width and 0.5 mm in thickness. And the 20 mm portion of the sample, measured from one of the 25 mm long edges of the aluminum plate (5), is overlapped and adhered together. Then, using the tensile tester, the load is applied on the aluminum plate (5) and the aluminum plate (5') in parallel but in opposite directions, at a tensile velocity of 10 mm/min, and the strength at which the modified porous layer is delaminated is measured. When the peel strength measured by this evaluation method is not less than 100 N/15 mm, then there will be few incidents of delamination of the laminated modified porous layer during the transportation and the process, even if the thickness of the polyolefin porous membrane is not more than 10 μm, for example.

T-peel strength or 180° peel strength, both of which are conventionally used for peel strength measurement, is the peel force required to peel off the coating layer from the polyethylene porous membrane in the direction perpendicular or from perpendicular to diagonally backward, to the polyethylene porous membrane surface. Compared to these conventional evaluation methods, this evaluation method may provides the better evaluation in relation to the actual scratch resistance during the slit process and the battery assembly process.

Solution to Problem

In order to solve the problems described above, a polyolefin porous membrane of the present invention comprises the configuration below. Namely, a polyolefin porous membrane comprising protrusions of polyolefin having size (W) within a range of 5 μm≤W≤50 μm and height (H) within a range of 0.5 μm≤H and randomly disposed on one side of the polyolefin porous membrane in density not less than 3/cm$^2$, and not more than 200/cm$^2$ and a thickness of the polyolefin porous membrane is not more than 20 μm.

In order to solve the problems described above, a battery separator of the present invention comprises the configuration below. Namely, a battery separator, in which a modified porous layer is laminated on a side that the protrusions are disposed on or both sides of the polyolefin porous membrane.

The modified porous layer in the battery separator of the present invention preferably comprises polyamideimide resin, polyimide resin or polyamide resin.

The modified porous layer in the battery separator of the present invention preferably comprises fluorine-based resin.

The modified porous layer in the battery separator of the present invention preferably comprises inorganic particles or cross-linked polymeric particles.

The thickness of the polyolefin porous membrane in the battery separator of the present invention is preferably not more than 16 μm.

The thickness of the polyolefin porous membrane in the battery separator of the present invention is preferably not more than 12 μm.

In order to solve the problems described above, a method of manufacturing the polyolefin porous membrane of the present invention comprises the configuration below. Namely, a method of manufacturing a polyolefin porous membrane, the method comprising the steps of:

(a) preparing polyethylene resin solution by melting and kneading after adding a forming solvent to polyethylene resin;

(b) extruding the polyethylene solution through a die, chilling by a chill-roll having a surface from which the forming solvent is removed, and forming a gel-like product;

(c) stretching the gel-like product in the machine direction and in the transverse direction to obtain a stretched and molded material;

(d) extracting and removing the forming solvent from the stretched and molded material followed by drying, to obtain a porous molded material; and (e) treating the porous molded material by heat to obtain a polyolefin porous membrane.

In the method of manufacturing a polyolefin porous membrane of the present invention, means to remove the forming solvent in step (b) is preferably a doctor blade.

In order to solve the problems described above, a method to manufacture a battery separator of the present invention comprises the configuration below. Namely, a method of manufacturing a battery separator, the method comprising the steps of:

(a) preparing polyethylene resin solution by melting and kneading after adding a forming solvent to polyethylene resin;

(b) extruding the polyethylene solution through a die, chilling by a chill-roll having a surface from which the forming solvent is removed, and forming a gel-like product;

(c) stretching the gel-like product in the machine direction and in the transverse direction to obtain a stretched and molded material;

(d) extracting and removing the forming solvent from the stretched and molded material followed by drying, to obtain a porous molded material; and (e) treating the porous molded material by heat to obtain a polyolefin porous membrane.

(f) coating a varnish on the polyolefin porous membrane, the varnish comprising fluorine-based resin and inorganic particles or cross-linked polymeric particles, and the fluorine-based resin concentration in the solution ingredients being not less than 0.5 wt. % and not more than 2.5 wt. % upon excluding the inorganic particles or cross-linked polymeric particles, (g) passing the polyolefin porous membrane coated with the varnish through a low-humidity zone in which the absolute humidity is less than 6 $g/m^3$, (h) passing the polyolefin porous membrane passed through the low-humidity zone through a high-humidity zone in which the absolute humidity is not less than 6 $g/m^3$, and (i) converting the coating layer containing the fluorine-based resin to a modified porous layer by immersing the polyolefin porous membrane passed through the high-humidity zone into a coagulating bath, washing, and drying to obtain a battery separator.

In the method of manufacturing a battery separator of the present invention, means to remove the forming solvent in step (b) is preferably a doctor blade.

Advantageous Effects of Invention

According to the present invention, a polyolefin porous membrane with exceptionally good adhesion between modified porous layers, and a battery separator with a modified porous layer, which does not delaminate even during high-speed transport, laminated on the polyolefin porous membrane, can be obtained.

DESCRIPTION OF EMBODIMENTS

Figure 1:
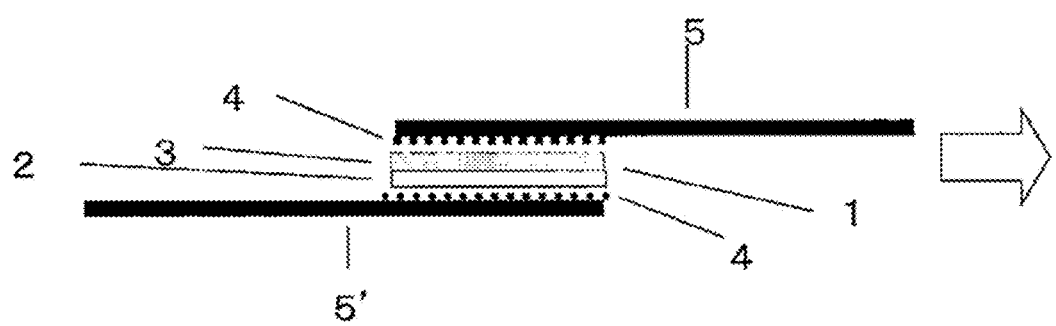
FIG. 1 is a schematic view of the measurement method for 0° peel strength.

The present invention is a polyolefin porous membrane with appropriate shape and protrusions on the surface, which can be obtained by using a specific polyolefin resin solution, and by specifically controlling the cooling rate of the polyolefin resin solution extruded through a die from an extruder during the steps of manufacturing the polyolefin porous membrane. Furthermore, the present invention is a polyolefin porous membrane, which, upon laminating a modified porous layer on the polyolefin porous membrane, has an excellent peel strength against the modified porous layer, and exhibits small increase in air permeation resistance.

Protrusions described in the present invention are fundamentally different from those obtained by adding inorganic particles, for example, to a polyolefin porous membrane. The protrusions obtained by adding inorganic particles to a polyolefin porous membrane are usually very low in their height, and forming the protrusions with height not less than 0.5 in the same manner would require particles with diameters equal to or larger than the thickness of the polyolefin porous membrane. However, addition of such particles would decrease the strength of the polyolefin porous membrane and unrealistic.

The protrusions described in the present invention is obtained by growing the parts of the polyolefin porous membrane to appropriate shapes, and do not degrade the basic properties of the polyolefin porous membrane.

Meanwhile, the randomly disposed protrusions described in the present invention are clearly different from the patterned or periodic arrangement of protrusions obtained by the process of an embossment roll before or after the stretching process during the manufacturing of the polyolefin porous membrane. In principle, press working such as embossment forms protrusions by compressing the parts other than the protrusions, and is not preferable due to possible decrease in air permeation resistance and in wettability toward electrolytic solution.

The protrusions with appropriate size described in the present invention are not less than 5 μm and not more than 50 μm in size, and are not less than 0.5 μm in height. Namely, 5 μm≤W≤50 μm, where W is protrusion size and 0.5 μm≤H, where H is protrusion height. Such protrusions can function as anchors upon laminating the modified porous layer on the porous membrane, and a battery separator with a large 0° peel strength described above can be obtained as a result. Meanwhile, the upper limit of the height is not particularly limited, but the height of 3.0 μm may be sufficient. Larger population of protrusions with sufficient height is likely to increase the 0° peel strength described above. Namely, 0° peel strength is influenced by the number and the average height of protrusions with height not less than 0.5 μm. The lower limit of the number of the protrusions is 3/cm$^2$, preferably 5/cm$^2$, and more preferably 10/cm$^2$. The upper limit of the number of the protrusions is 200/cm$^2$, and preferably 150/cm$^2$. The lower limit of the height of the protrusions is 0.5 μm, preferably 0.8 μm, and more preferably 1.0 μm.

Size and height of the protrusions in the present invention are values measured by the measurement method described below.

The increase in air permeation resistance described in the present invention is the difference between air permeation resistance of a polyolefin porous membrane that is a substrate and air permeation resistance of a battery separator laminated with a modified porous layer, and preferably not more than 100 sec/100 cc Air.

The overview of the polyolefin porous membrane and the battery separator of the present invention is described, but the scope of the invention is not naturally limited to these representative examples.

First, the polyolefin porous membrane of the present invention is described.

The thickness of the polyolefin porous membrane of the present invention is not more than 20 μm. The upper limit is preferably 16 μm and more preferably 12 μm. The lower limit is 7 μm, and preferably 9 μm. When the thickness of the polyolefin porous membrane is in the preferable ranges described above, practical membrane strength and pore blocking function can be achieved, the area in the unit volume of the battery case is not restricted and it is suitable for increase in battery capacity expected in the future.

The upper limit of the air permeation resistance of the polyolefin porous membrane is 300 sec/100 cc Air, preferably 200 sec/100 cc Air, and more preferably 150 sec/100 cc Air, while the lower limit is 50 sec/100 cc Air, preferably 70 sec/100 cc Air, and more preferably 100 sec/100 cc Air.

For the porosity of the polyolefin porous membrane, the upper limit is preferably 70%, more preferably 60% and even more preferably 55%. The lower limit is preferably 30%, more preferably 35%, and even more preferably 40%. When air permeation resistance and porosity are in the preferable ranges described above, sufficient battery charge/discharge characteristics, especially sufficient ion permeability (charge/discharge operating voltage) and life of a battery (closely related to the amount of an electrolytic solution to be retained) are achieved, functions as a battery may be sufficiently exhibited and sufficient mechanical strength and insulation may reduce the possibility of shorting during charge/discharge.

Since the average pore diameter in the polyolefin porous membrane affects pore blocking characteristics greatly, it is preferably from 0.01 to 1.0 μm, more preferably from 0.05 to 0.5 μm, and even more preferably from 0.1 to 0.3 μm. When the average pore diameter in the polyolefin porous membrane is in the preferable ranges described above, the sufficient 0° peel strength of the modified porous layer described above can be achieved due to the anchor effect of the functionalized resin, the air permeation resistance may not be significantly deteriorated upon laminating the modified porous layer, the response of the pore blocking phenomenon to the temperature may not slow down and pore blocking temperature associated with the rate of temperature increase may not shift to higher temperature.

For the polyolefin resin that configures the polyolefin porous membrane, polyethylene and polypropylene are preferable. Additionally, the polyolefin resin can be a single component, a mixture of two or more kinds of different polyolefin resins, for example a mixture of polyethylene and polypropylene, or copolymer of different olefins. They possess pore blocking effect that blocks electrical current and prevents excessive temperature increase upon abnormal temperature increase in batteries, in addition to basic properties such as electrical insulating properties, ion permeability and the like.

Among these, polyethylene is more preferable from the point of view of good pore blocking characteristics. Details are discussed below with polyethylene as a polyolefin resin used in the present invention.

Polyethylene includes high molecular weight polyethylene, high density polyethylene, medium-density polyethylene, low density polyethylene and the like. Additionally, polymerization catalysts are not limited, and include Ziegler-Natta catalyst, Phillips catalyst, metallocene catalyst and the like. These polyethylenes may be not only a homopolymer of ethylene, but also a copolymer that contains small amount of other α-olefin. Preferable α-olefin other than ethylene includes propylene, 1-butene, 1-pentene, 1-hexene, 4-methyl-1-pentene, 1-octene, (meth)acrylic acid, ester of (meth)acrylic acid, styrene and the like.

Polyethylene may be single component, but preferably a mixture of two or more kinds of polyethylene. As a polyethylene mixture, a mixture of two or more kinds of high molecular weight polyethylene with different weight average molecular weight (Mw), or a mixture of similar kind of high density polyethylene, medium-density polyethylene and low density polyethylene can be used. Also, a mixture of two or more kinds of polyethylene selected from the group consisting of high molecular weight polyethylene, high density polyethylene, medium-density polyethylene and low density polyethylene.

As a polyethylene mixture, a mixture of high molecular weight polyethylene with Mw not less than $5\times10^5$ and polyethylene with Mw not less than $1\times10^4$ and less than $5\times10^5$ is preferred. Mw of high molecular weight polyethylene is preferably from $5\times10^5$ to $1\times10^7$, more preferably from $1\times10^6$ to $15\times10^6$, and most preferably from $1\times10^6$ to $5\times10^6$. As polyethylene with Mw not less than $1\times10^4$ and less than $5\times10^5$, any one of high density polyethylene, medium-density polyethylene or low density polyethylene can be used, but specifically high density polyethylene is preferably used. As polyethylene with Mw not less than $1\times10^4$ and less than $5\times10^5$, two or more kinds of polyethylene with different Mw may be used or two or more kinds of polyethylene with different densities can be used. Setting the upper limit of Mw of a polyethylene mixture to $15\times10^6$ facilitates melting and extruding.

In the present invention, the upper limit for high molecular weight polyethylene content is preferably 40 wt. %, more preferably 30 wt. %, and even more preferably 10 wt. %. The lower limit is 1 wt. %, more preferably 2 wt. % and even more preferably 5 wt. %.

If the content of high molecular weight polyethylene is within the preferable range, protrusions with sufficient height can be obtained. These protrusions function as anchors upon laminating a modified porous layer, resulting in exceptionally large peel resistance against a force applied parallel to the planer directions of the polyethylene porous membrane. Also, even when the polyethylene porous membrane thickness is reduced, sufficient tensile strength can be obtained. Preferably, tensile strength is not less than 100 MPa. The upper limit is not particularly defined.

Figure 2:
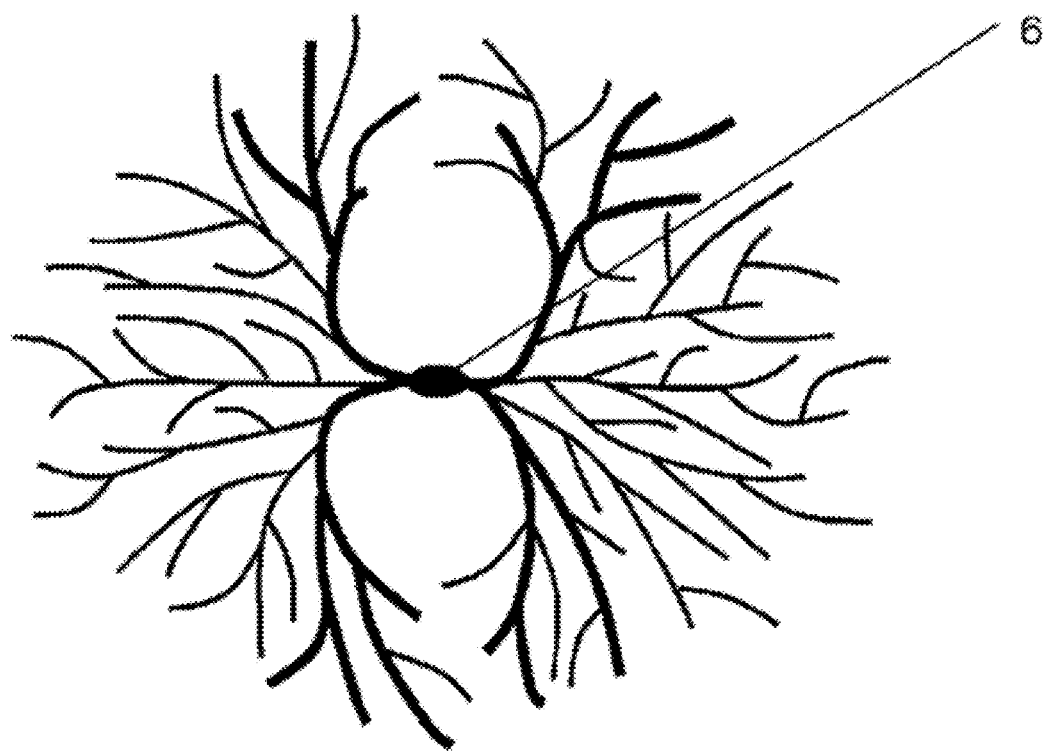
FIG. 2 is a schematic view illustrating a spherulite structure and a spherulite nucleus of polyethylene in the polyethylene porous membrane.
Figure 3:
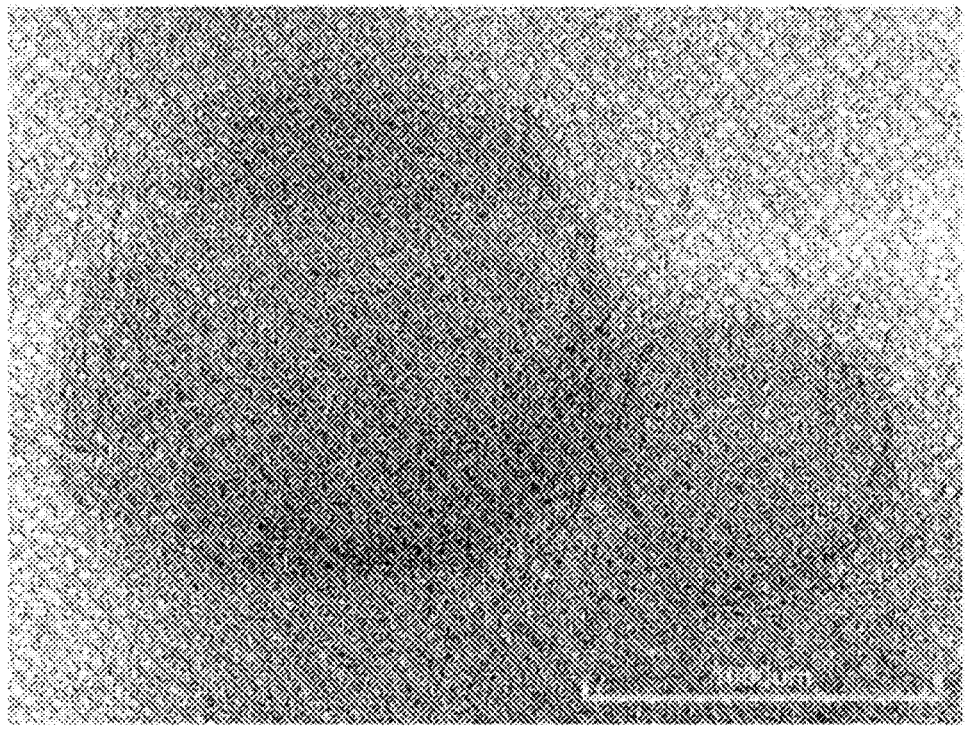
FIG. 3 is a micrograph of a ring-shaped mark on the polyethylene porous membrane, originating from the spherulite of polyethylene.

The inventors of the present invention consider the mechanism of protrusion formation as described in the present invention as follows. Crystallization of polyethylene begins simultaneously as extrusion of melt polyethylene resin and a forming solvent through the die, and the rate of crystallization increases due to rapid quenching caused by contact with the chill-roll. At this point, spherulites with symmetrical structure containing nuclei are formed (FIG. 2). If heat conduction rate between chill-roll surface and the melt polyethylene resin is relatively small, the rate of crystallization is small, resulting in spherulites containing relatively small nuclei if heat conduction rate is large, spherulites containing relatively large nuclei are formed. These nuclei in the spherulites form protrusions during stretching in TD (transverse direction) and/or MD (machine direction) in the later process. Meanwhile, spherulites appear as a ring-shaped marks on polyethylene porous membrane surface (FIG. 3).

Molecular weight distribution (Mw/Mn) of the polyethylene resin, namely, the ratio of weight average molecular weight (Mw) to number-average molecular weight (Mn), is preferably in the range from 5 to 200, and more preferably in the range from 10 to 100. The value of Mw/Mn within the preferable range described above facilitates extrusion of polyethylene solution and provides sufficient numbers of protrusions. Furthermore, it provides sufficient mechanical strength upon decreasing polyethylene porous membrane thickness. The value Mw/Mn is used as a measure of molecular weight distribution, and when this value is larger for polyethylene formed of a single component, the width of molecular weight distribution is larger. The value Mw/Mn of polyethylene formed of a single component can be adjusted as appropriate by multi-step polymerization of polyethylene. Meanwhile, the value Mw/Mn of a polyethylene mixture can be adjusted as appropriate by adjusting molecular weight or mixing ratio of each component.

To manufacture a polyethylene porous membrane, as long as the various characteristics described above are satisfied, any manufacturing method suitable for an objective can be selected optionally. Manufacturing methods of porous membranes include the foaming method, the phase-separation method, the melt-recrystallization method, the drawing-pore-opening method, the powder-sintering method and the like, and the phase-separation method is preferred among them from the viewpoints of homogenization of micropores and costs.

Examples of the manufacturing method according to the phase-separation method include a method comprising melting and kneading, for example, polyethylene with a forming solvent, extruding the resultant molten mixture through a die, cooling the extrudate to form a gel-like product, stretching the obtained gel-like product in one or more axes, and removing the forming solvent, to obtain a porous membrane.

The polyethylene porous membrane may be a monolayer membrane or a membrane comprising two or more layers with different molecular weights or different average micropore sizes.

Manufacturing methods of a multi-layer membrane with two or more layers can be any one of the following methods. For example, in one method, each polyethylene that configures layer a and layer b is melt and kneaded with a forming solvent and the obtained molten mixture is extruded from the respective extruders to a die, merging respective gel-sheets configuring each ingredient by co-extrusion. In another method, respective gel-sheets configuring each layers are overlapped and hot-melt. The co-extrusion method is preferred because a high inter-layer adhesive strength is easily achieved; high permeability is easily maintained because communication holes are easily formed between layers; and productivity is superior.

For a layer configuration with two or more layers, it is preferable that the molecular weight and the molecular weight distribution of the polyethylene resin in one or more outer layer satisfy the conditions described above.

It is necessary for a polyethylene porous membrane to possess the function in which the pores are blocked in the case of abnormal charge/discharge reactions. Therefore, the melting point (softening point) of the configured resins is preferably from 70 to 150° C., more preferably from 80 to 140° C., and even more preferably 100 to 130° C. If the melting point of the configured resin is within the preferred range described above, erroneous battery shutdown due to pore blocking function during the normal operation can be avoided and safety is ensured by the pore blocking function in the event of abnormal reaction.

A method of manufacturing the polyolefin porous membrane of the present invention is described.

A method of manufacturing the polyolefin porous membrane of the present invention comprises the steps of:

(a) preparing polyolefin resin solution by melting and kneading after adding a forming solvent to polyolefin resin;

(b) extruding the polyolefin resin solution through a die, chilling by a chill-roll having a surface, from which the forming solvent is removed by the forming solvent removal means, and forming a gel-like product;

(c) stretching the gel-like product in MD (the machine direction) and in TD (the transverse direction) to obtain a stretched and molded material;

(d) extracting and removing the forming solvent from the stretched and molded material followed by drying, to obtain a porous molded material; and (e) treating the porous molded material by heat to obtain a polyolefin porous membrane.

Furthermore, the corona treatment step and the like can be optionally implemented after the steps from (a) to (e).

Each step is described below using the example in which polyethylene resin is used as polyolefin resin.

(a) The step of preparing polyethylene resin solution by melting and kneading after adding a forming solvent to polyethylene resin A forming solvent is not limited as long as it can dissolve polyethylene sufficiently. For example, aliphatic or cyclic hydrocarbon such as nonane, decane, undecane, dodecane, liquid paraffin and the like, or mineral oil fractions with their boiling points corresponding to these are included. A non-volatile solvent such as liquid paraffin is preferable to obtain a gel-like product with constant solvent content. Heat-melting is performed by stirring the polyethylene composition or homogeneously mixing polyethylene composition in the extruder at the temperature at which the polyethylene composition can be completely dissolved. Though the temperature is dependent on polymer and solvent in case of stirring the polyethylene composition in the solvent or in the extruder, it is preferable in the range from 140 to 250° C., for example.

The concentration of the polyethylene resin is from 25 to 40 parts by weight, and preferably from 28 to 35 parts by weight, per 100 parts by weight of the total of the polyethylene resin and the forming solvent. If the polyethylene resin concentration is within the preferable range described above, sufficient number of the nuclei to form protrusions are formed, resulting in sufficient number of protrusions. Additionally, swell and neck-in phenomena at the outlet of the die can be suppressed as the polyethylene resin solution is extruded, and moldability and self-supporting characteristics of the extrudate are maintained.

The method of melting and kneading is not particularly limited, but normally homogeneous kneading is done in the extruder. This method is suitable for preparing the solution with high concentration of polyethylene. The melting temperature is preferably in the range from E+10° C. to E+100° C., where E is the melting point of polyethylene. Generally, the melting temperature is preferably in the range from 160 to 230° C., and more preferably in the range from 170 to 200° C. The melting point herein is the value obtained by differential scanning calorimetry (DSC) according to JIS K 7121. The forming solvent may be added before kneading or added during the kneading from the middle of the extruder, and melt-kneaded further. Preferably the forming solvent is added to prepare the solution before kneading. For melting and kneading, antioxidant is preferably added to prevent oxidation of polyethylene.

(b) The step of extruding the polyethylene resin solution through a die, chilling by a chill-roll having a surface, from which the forming solvent is removed by the forming solvent removal means, and forming a gel-like product Melt and kneaded polyethylene resin solution is extruded through a die from the extruder directly or via another extruder. A die for a sheet with a rectangular mouthpiece is generally used.

The polyethylene resin solution extruded from the die is brought to contact with a rolling chill-roll. The surface of the chill-roll is controlled by the refrigerant to the temperature from 20° C. to 40° C. and the gel-like product is formed. The extruded polyethylene resin solution is preferably cooled down to a temperature of not more than 25° C. The cooling rate in the temperature range that the crystallization actually occurs is important. For example, the polyethylene resin solution is cooled at the cooling rate not less than 10° C./sec. in the temperature range that the crystallization actually occurs, and the gel-like product is obtained. The cooling rate is preferably not less than 20° C./sec., more preferably not less than 30° C./sec., and even more preferably not less than 50° C./sec. The cooling step described above can immobilize microphase-separated structures in which a polyethylene phase is separated by solvent, form spherulites comprising relatively large nuclei on the surface of the gel-like product in contact with the chill-roll and form protrusions with appropriate shapes after stretching. The cooling rate can be estimated from the simulation using parameters such as extruding temperature of the gel-like product, thermal conductivity of the gel-like product, the thickness of the gel-like product, and heat transfer coefficients of the forming solvent, the chill-roll and air.

Figure 4:
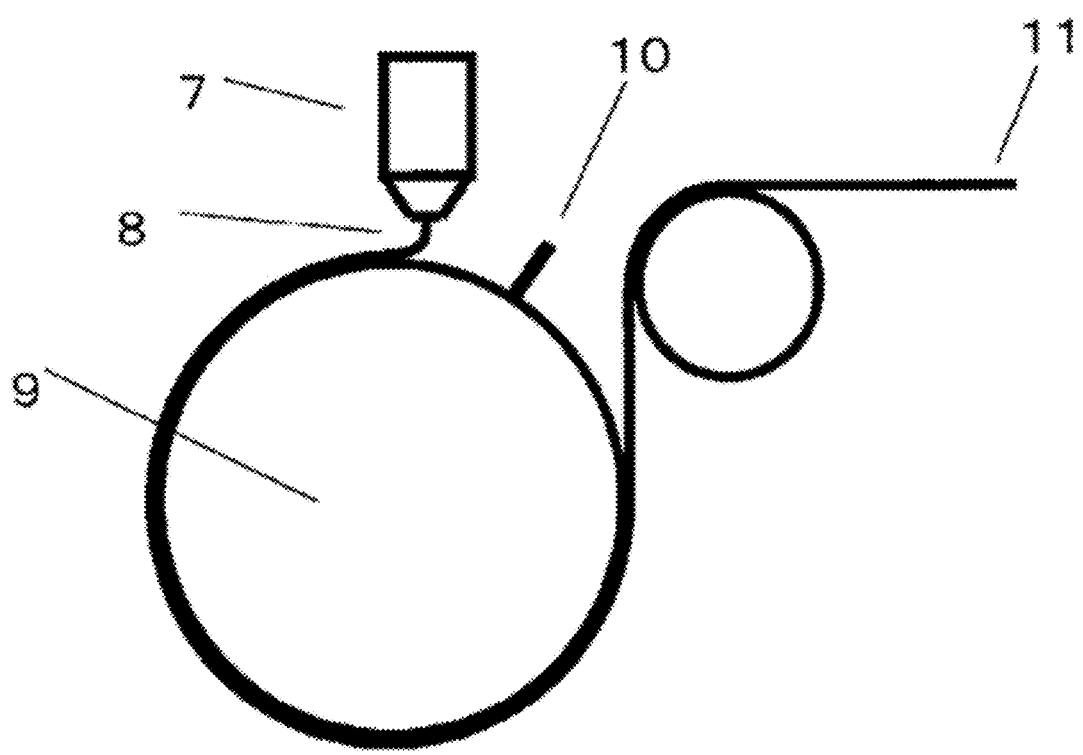
FIG. 4 is a schematic view of the steps to extrude polyethylene resin solution through a die disposed at the end of the extruder and to chill the extrudate by a chill-roll to form a gel-like product.

Additionally, in the present invention, it is important to remove a forming solvent deposited on the chill-roll surface, which will be in contact with the polyethylene resin solution extruded from the die, as much as possible. Specifically, as illustrated in FIG. 4, the polyethylene resin solution is chilled and formed into the gel-like product upon contact with the rolling chill-roll and the forming solvent is present on the chill-roll surface after the formed gel-like product is removed. Generally, the roll surface as-is will be in contact with the polyethylene resin solution again. However, the large amount of the forming solvent deposited on the chill-roll surface has thermal insulation effect, which decelerates the cooling rate and hinders the protrusion formation. Therefore, it is important to remove a forming solvent as much as possible before the chill-roll will be brought to contact with the polyethylene resin solution again.

The means to remove a forming solvent, namely, the means to remove the forming solvent from the chill-roll is not particularly limited. But the preferable means comprises placing a doctor blade on the chill-roll parallel to the transverse direction of the gel-like product and scraping off the forming solvent to the extent that the forming solvent may not be observable on the chill-roll surface from the point immediately after the doctor blade to the point of gel-like product contact. Alternatively, the forming solvent can be removed by the means comprising blowing off the forming solvent by compressed air, the means comprising pumping out the forming solvent, or the combination of these means. Among these means, the means using a doctor blade scraping off the forming solvent is preferable since it is relatively easily implemented, and the use of the two or more doctor blades instead of one is more preferred due to improvement in the effective removal of the forming solvent.

The material of the doctor blade is not particularly limited as long as it has resistance to the forming solvent. But a resin or rubber doctor blade is preferred compared to a metal doctor blade. A metal doctor blade may possibly damage the chill-roll. Resin doctor blades include polyester, polyacetal, polyethylene doctor blades and the like.

Even if the chill-roll temperature is set to less than 20° C., the insulating effect of the forming solvent may not only fail to achieve sufficient cooling rate, but also cause roughening of the surface of the gel-like product due to dew formation on the chill-roll.

The thickness of the polyethylene resin solution upon the extrusion is preferably not more than 1,500 μm, more preferably not more than 1,000 μm, and even more preferably not more than 800 μm. If the thickness of the polyethylene resin solution upon the extrusion is within the range described above, it is preferable since the cooling rate of the chill-roll surface is not decelerated.

(c) The step of stretching the gel-like product in MD (the machine direction) and in TD (the transverse direction) to obtain a stretched and molded material Next, the gel-like product is stretched to form a stretched and molded material. The step of stretching involves heating of the gel-like product and stretching the gel-like product in MD and TD at the pre-determined magnifications using a common tenter method, roll method or combination thereof. Stretching may be simultaneous stretching (simultaneous biaxial stretching) in MD and TD (machine direction and transverse direction) or may be sequential stretching. The order of the sequential stretching can be any of the ordering between MD and TD, and stretching in MD and/or TD can be multiple steps. The stretching temperature is not more than M+10° C., where M is the melting point of the polyolefin composition. Additionally, the magnification of the stretching is dependent on the thickness of the material, planer magnification is preferably not less than 9 and more preferably from 16 to 400. In case of simultaneous stretching in MD and TD (simultaneous biaxial stretching), the identical magnification for MD and TD, such as 3λ3, 5×5 and 7×7, is preferred. The planer magnification within the preferable range described above provides sufficient stretching and results in the porous membrane with high modulus and large strength. Also, by controlling the stretching temperature, the desirable air permeation resistance can be obtained.

(d) The step of extracting and removing the forming solvent from the stretched and molded material followed by drying, to obtain a porous molded material In this step, the stretched and molded material is treated with washing solvent to remove residual forming solvent and the porous membrane is obtained. The washing solvents that can be used are volatile solvents, and include hydrocarbons such as pentane, hexane, heptane and the like, chlorinated hydrocarbons such as methylene chloride, carbon tetrachloride and the like, fluorinated hydrocarbons such as trifluoroethane and the like, ethers such as diethylether, dioxane and the like. These washing solvents are appropriately selected according to the forming solvent used for dissolving polyethylene, and can be used alone or in combination thereof. The washing method includes immersion and extraction in the washing solvent, showering the washing solvent, suctioning the washing solvent from the opposite side of the stretched and molded material and the combination thereof.

Washing described above is continued until the residual solvent in stretched and molded material reaches less than 1 wt. %. After the washing, the washing solvents are dried. The method of drying the washing solvents include heat drying, air-dry and the like.

(e) The step of treating the porous molded material by heat to obtain a polyethylene porous membrane The porous molded material obtained by drying further undergoes thermal treatment to obtain a polyethylene porous membrane. The thermal treatment temperature is preferable from 90 to 150° C. The thermal treatment temperature within the preferable range described above can achieve sufficient reduction in thermal shrinkage and air permeation resistance of the polyolefin porous membrane obtained. The residence time of the thermal treatment step is not particularly limited, but generally is not less than 1 second and not more than 10 minutes, and preferably from 3 seconds to not more than 2 minutes. The thermal treatment can be done by any of the methods among the tenter method, roll method, pressing method, or free method.

Furthermore, it is preferable to shrink the porous molded material in at least one of MD (machine direction) and TD (transverse direction), while the porous molded material is fixed in the both directions, MD and TD in the thermal treatment step. By shrinking the porous molded material in at least one of MD and TD, while the porous molded material is fixed in the both directions, MD and TD, the thermal shrinkage of the porous molded material is good. The ratio of shrinking the porous molded material in at least one of MD and TD, is from 0.01 to 50%, and preferably 3 to 20%. The ratio of shrinking within the preferable range described above improves the heat shrinkage after 8 hours at 105° C. and maintains air permeation resistance.

Meanwhile, the functionalization steps such as corona treatment step or hydrophilization step can be implemented optionally after the steps (a) to (e).

The battery separator of the present invention comprises a modified porous layer laminated at least on the surface having protrusions of the polyolefin porous membrane. This modified porous layer is explained below.

A modified porous layer is preferably laminated on the side having protrusions of the polyolefin porous membrane. When modified porous layers are disposed on the both sides, it is preferable that the side, on which the modified porous layer is laminated on the side having protrusions of the polyethylene porous membrane, is set to the side which experiences larger amount of forces parallel to the modified porous layer surface during the later steps such as slit process and transport step, since the effect of the present invention can be demonstrated effectively.

A modified porous layer described in the present invention is not particularly limited if the layer includes functionalized resin, namely, resin that provides or improves at least one of the functions among heat resistance, adhesion with an electrode material, wettability toward electrolytic solution and the like. The modified porous layers preferably include inorganic particles or cross-linked polymeric particles in addition to functionalized resin.

As functionalized resin, from the viewpoint of heat resistance improvement, for example, the heat-resistant resin used preferably has glass transition temperature or melting point not less than 150° C., more preferably not less than 180° C., and even more preferably not less than 210° C. It is not particularly necessary to specify the upper limits for glass transition temperature or melting point. When the glass transition temperature is higher than degradation temperature, the degradation temperature may be within the range described above. If the lower limit of the glass transition temperature is within the preferable range described above, sufficient heat-resistant membrane puncture temperature can be established and a great degree of safety is maintained.

As heat-resistant resin, for example, resin which comprises polyamideimide, polyimide or polyamide as a major ingredient can be used preferably. Among these, the resin comprising polyamideimide as a major ingredient is particularly preferred. These resin can be used alone or in combination with the other materials.

From the viewpoint of adhesion to electrodes, it is preferable to use one or more kinds of resin selected from the group consisting of vinylidene fluoride homopolymer, vinylidene fluoride/olefin fluoride copolymer, vinyl fluoride homopolymer and vinyl fluoride/olefin fluoride copolymer, as functionalized resin. Polytetrafluoroethylene is particularly preferred. These polymers can sustain sufficient affinity toward electrolytic solution during use at high temperature, since they have sufficient adhesion to electrodes, great affinity toward non-aqueous electrolytic solution, appropriate heat resistance and great chemical and physical stability toward non-aqueous electrolytic solution. Polyvinylidene fluoride (PVDF) is preferable.

The details of the functionalized resin are described below using polyamideimide resin as an example.

In general, the synthesis of polyamideimide resin include the acid chloride method, in which trimellitic chloride and diamine are used, the diisocyanate method, in which trimellitic anhydride and diisocyanate are used, and the like The diisocyanate method is preferable from the viewpoint of manufacturing cost.

Acid component used in the synthesis of polyamideimide resin includes trimellitic anhydride (chloride) and some parts of the acid component may be substituted with the other polybasic acid or anhydride thereof. Examples include tetracarboxylic acids and anhydrides thereof such as pyromellitic acid, biphenyl tetracarboxylic acid, biphenylsulphone tetracarboxylic acid, benzophenone tetracarboxylic acid, biphenylether tetracarboxylic acid, ethyleneglycol bis-trimellitate, propyleneglycol bis-trimellitate and the like, aliphatic dicarboxylic acids such as oxalic acid, adipic acid, malonic acid, sebacic acid, azelaic acid, dodecane dicarboxylic acid, dicarboxy polybutadiene, dicarboxy poly(acrylonitrile-butadiene), dicarboxy poly(styrene-butadiene) and the like, alicyclic dicarboxylic acids such as 1,4-cyclohexane dicarboxylic acid, 1,3-cyclohexane dicarboxylic acid, 4,4'-dicyclohexyl methane dicarboxylic acid, dimer acid and the like, aromatic dicarboxylic acids such as terephthalic acid, isophthalic acid, diphenylsulphone dicarboxylic acid, diphenylether dicarboxylic acid, naphthalene dicarboxylic acid and the like. Among these examples, 1,3-cyclohexane dicarboxylic acid and 1,4-cyclohexane dicarboxylic acid are preferable from the viewpoints of electrolytic solution resistance, and dimer acid, dicarboxy polybutadiene with molecular weight not less than 1,000, dicarboxy poly(acrylonitrile-butadiene) and dicarboxy poly(styrene-butadiene) are preferable from the viewpoint of shut-down characteristics.

Also, a urethane group may be introduced into the molecule by substituting the part of trimellitic acid compound with glycol. The glycol include alkylene glycol such as ethylene glycol, propylene glycol, tetramethylene glycol, neopentyl glycol, hexanediol and the like, polyalkylene glycol such as polyethyleneglycol, polypropylene glycol, polytetramethylene glycol and the like, polyester with hydroxy terminal groups synthesized from one or more kinds of dicarboxylic acids described above and one or more than two kinds of glycol described above and the like. Among these, polyethyleneglycol and polyester with hydroxy terminal groups are preferred. In addition, number-average molecular weight of these is preferably not less than 500, and more preferably not less than 1,000. The upper limit is not particularly limited, but preferably it is less than 8,000.

If a part of the acid component is substituted with at least one of the group consisting of dimer acid, polyalkylene ether, polyester, and butadiene-based rubber containing any one of carboxyl group, hydroxyl group and amino group at the terminal, it is preferable to substitute the amount from 1 to 60 mol % of the acid component.

A diamine (diisocyanate) component that is used for synthesis of the polyamideimide resin preferably includes o-tolidine and tolylenediamine as the components, and a component that substitutes the part thereof includes aliphatic diamine such as ethylenediamine, propylenediamine and hexamethylenediamine and diisocyanates thereof, alicyclic diamine such as 1,4-cyclohexanediamine, 1,3-cyclohexanediamine and dicyclohexylmethanediamine and diisocyanates thereof, and aromatic diamine such as m-phenylenediamine, p-phenylenediamine, 4,4'-diaminodiphenyl methane, 4,4'-diaminodiphenyl ether, 4,4'-diaminodiphenyl sulfone, benzidine, xylylenediamine and naphthalene diamine and diisocyanates thereof, and among them, dicyclohexylmethanediamine and diisocyanate thereof are most preferable, and 4,4'-diaminodiphenyl methane, naphthalenediamine and diisocyanates thereof are preferable, from the viewpoints of reactivity, costs and electrolytic solution resistance. In particular, o-tolidine diisocyanate (TODI), 2,4-tolidine diisocyanate (TDI) and blends thereof are preferable. Furthermore, for improving 0° peel strength of the modified porous layer, the content of o-tolidine diisocyanate (TODI) that has high modulus is not less than 50 mole percent, preferably not less than 60 mole percent, and even more preferably not less than 70 mole percent, based on the total amount of all isocyanates.

The polyamideimide resin can be easily produced by stirring in a polar solvent such as N,N'-dimethylformamide, N,N'-dimethylacetamide, N-methyl-2-pyrrolidone, or γ-butyrolactone while heating at from 60 to 200° C. In this case, amine such as triethylamine or diethylene triamine, or an alkali metal salt such as sodium fluoride, potassium fluoride, cesium fluoride or sodium methoxide can also be used optionally as a catalyst.

When the polyamideimide resin is used in the present invention, the logarithmic viscosity thereof is preferably not less than 0.5 dL/g. If the logarithmic viscosity of the polyamideimide resin is within the preferable range described above, the melt-down characteristics can be sufficiently achieved and the polyolefin porous membrane can be prevented from becoming fragile. Also, 0° peel strength can be improved due to the anchor effect. Meanwhile, the upper limit is preferably less than 2.0 dL/g, considering the processability and solubility toward solvents.

The modified porous layer of the present invention can be obtained by coating a resin solution (referred to as varnish in some cases, hereafter) dissolved in a solvent, which can dissolve functionalized resin and miscible with water, on a predetermined substrate, phase-separating the functionalized resin and the solvent under the humidified condition, and solidifying the resin under water bath (referred to as a coagulating bath in some cases, hereafter). A phase-separation assisting agent can be added to varnish optionally.

Solvents to dissolve the functionalized resin include N,N-dimethyl acetamide (DMAc), N-methyl-2-pyrrolidone (NMP), hexamethylphosphoric triamide (HMPA), N,N-dimethylformamide (DMF), dimethyl sulfoxide (DMSO), γ-butyrolactone, chloroform, tetrachloroethane, dichloroethane, 3-chloro naphthalene, parachlorophenol, tetralin, acetone, acetonitrile and the like, and it can be selected according to the solubility of the resin without restriction.

Solid concentration of the varnish is not particularly limited as long as it can be coated uniformly, but it is preferably not less than 50 wt. % and not more than 98 wt. % and more preferably not less than 80 wt. % and not more than 95 wt. %. The solid concentration of the varnish within the preferable range described above can prevent the modified porous layer from becoming fragile and achieve sufficient 0° peel strength of the modified porous layer.

Phase-separation assisting agents used in the present invention is one or more kinds of agents selected from water, alkylene glycol such as ethylene glycol, propylene glycol, tetramethylene glycol, neopentyl glycol, hexanediol and the like, polyalkylene glycol such as polyethylene glycol, polypropylene glycol, polytetramethylene glycol and the like, water soluble polyester, water soluble polyurethane, polyvinylalcohol, carboxymethylcellulose and the like.

The amount of phase-separation assisting agent added is preferably from 10 to 90 wt. %, more preferably from 20 to 80 wt. % and even more preferably from 30 to 70 wt. % based on the weight of the varnish solution. Mixing these phase-separation assisting agents to the varnish can mainly control the air permeation resistance, the surface open porosity and the rate of layer structure formation. If the amount added is within the preferable range described above, the rate of phase separation is significantly increased. In addition, it will prevent the resin solution from becoming turbid and resin component from deposited during mixing.

In order to reduce the curl of the polyolefin porous membrane caused by laminating the modified porous layer, it is important to add inorganic particles or cross-linked polymeric particles to the varnish. Addition of inorganic particles or cross-linked polymeric particles to the varnish can prevent internal short-circuit caused by growth of dendrite crystals of the electrodes inside the battery (anti-dendrite formation effect), reduce the thermal shrinkage and provide lubrication. The upper limit for the amount of the particles added is preferably 98 wt. % and more preferably 95 wt. %. The lower limit is preferably 80 wt. % and more preferably 85 wt. %. When the amount of the particle added is within the preferable range described above, the reduction of the curl is sufficient, the ratio of the functionalized resin based on the total volume of the modified porous layer is the most suitable and sufficient 0° peel strength of the modified porous layer can be obtained.

Examples of inorganic particles include calcium carbonate, calcium phosphate, amorphous silica, crystalline glass fillers, kaolin, talc, titanium dioxide, alumina, silica-alumina conjugate oxide particles, barium sulfate, calcium fluoride, lithium fluoride, zeolite, molybdenum sulphide, mica and the like. Examples of heat-resistant cross-linked polymeric particles include cross-linked polystyrene particles, cross-linked acrylate-based resin particles, cross-linked methyl-methacrylate based particles and the like.

The average size of these particles is preferably not less than 1.5 times and not more than 50 times as large as the average pore diameter of the polyolefin porous membrane. It is more preferably not less than 2.0 times and not more than 20 times as large as the average pore diameter. When the average size of the particles is within the preferable range described above, the pores in the polyolefin porous membrane may not be blocked even if the heat-resistant resin and the particles coexist, and air permeation resistance can be maintained. Meanwhile, it can prevent shedding of particles during the battery assembly process, which may cause serious failure.

The shape of the particles includes spherical shape, approximate spherical shape, plate shape, needle shape, or polyhedron shape. But it is not particularly limited.

The thickness of the modified porous layer is from 1 to 5 μm, preferably from 1 to 4 μm and more preferably from 1 to 3 μm. When the thickness of the modified porous layer is within the preferable range described above, a battery separator obtained by laminating the modified porous layer can maintain membrane puncture resistance and electrical insulation in the event of melting/shrinking at the melting point or higher temperature and prevent abnormal reaction by having sufficient pore blocking function. In addition, the volume upon winding can be reduced, thus being suitable for battery capacity increase. Furthermore, the reduction in the curl can improve productivity in the battery assembly process.

The porosity of the modified porous layer is preferably from 30 to 90%, and more preferably from 40 to 70%. When the porosity of the modified porous layer is within the preferable range described above, a battery separator obtained by laminating the modified porous layer has low electrical resistance and exhibits increase in electrical current. Also the membrane strength can be maintained.

The upper limit for the total thickness of the battery separator obtained by laminating the modified porous layer is preferably 25 μm, and more preferably 20 μm. The lower limit is preferably not less than 6 μm and more preferably not less than 7 μm. When the total thickness of the battery separator is within the preferable range described above, the battery separator obtained by laminating the modified porous layer can achieve sufficient mechanical strength and electrical insulation. In addition, capacity reduction can be avoided since the electrode areas filling the battery can be reduced.

The air permeation resistance of the battery separator is one of the most important characteristics and preferably ranges from 50 to 600 sec/100 cc Air, more preferably from 100 to 500 sec/100 cc Air, and even more preferably from 100 to 400 sec/100 cc Air. When the air permeation resistance of the battery separator is within the preferable range described above, sufficient electrical insulation can be achieved and clogging, shorting and membrane puncture can be avoided. In addition, reduction in the membrane electrical resistance can achieve charge-discharge characteristics and battery life characteristics within the range of practical use.

The method of laminating the modified porous layer configuring the battery separator of the present invention is described below.

The method of laminating the modified porous layer on the polyolefin porous membrane may be a method, in which the varnish is directly coated onto the polyolefin porous membrane and converted to the modified porous layer (the direct method), or a method, in which the varnish is coated on a substrate film (e.g. polypropylene film or polyester film), phase-separated for the functionalized resin component and the solvent component and converted to the modified porous layer under the specified humidified environment, followed by transfer to the polyolefin porous membrane to produce the laminate (the transfer method).

In the present invention, the preferable method for laminating the modified porous layer comprises the steps from (f) to (i) in the manufacturing steps.

(f) The step of coating a varnish on the polyolefin porous membrane, the varnish comprising fluorine-based resin and inorganic particles or cross-linked polymeric particles, and the fluorine-based resin concentration in the solution ingredients being not less than 0.5 wt. % and not more than 2.5 wt. % upon excluding the inorganic particles or cross-linked polymeric particles;

(g) The step of passing the polyolefin porous membrane coated with the varnish through a low-humidity zone in which the absolute humidity is less than 6 g/m$^3$;

(h) The step of passing the polyolefin porous membrane passed through the low-humidity zone through a high-humidity zone in which the absolute humidity is not less than 6 g/m$^3$; and (i) The step of converting the coating layer containing the fluorine-based resin to a modified porous layer by immersing the polyolefin porous membrane passed through the high-humidity zone into a coagulating bath, washing, and drying to obtain a battery separator.

The further details are described below.

The varnish comprising the functionalized resin solution, in which the functionalized resin is dissolved in the solvent capable of dissolving the functionalized resin and miscible with water, and inorganic particles or cross-linked polymeric particles as major ingredients, is coated on the polyolefin porous membrane. Afterwards, the varnish-coated polyolefin porous membrane is placed under the pre-determined humidified environment, and the varnish is phase-separated. Then, the functionalized resin is solidified in the water bath (coagulating bath) and the modified porous layer is obtained.

The low-humidity zone in the present invention is the zone controlled to the absolute humidity less than 6 g/m$^3$, with the preferable upper limit of 4 g/m$^3$, the more preferable upper limit of 3 g/m$^3$, with the preferable lower limit of 0.5 g/m$^3$, and the more preferable lower limit of 0.8 g/m$^3$. When the absolute humidity is within the preferable range described above, the phase-separation is sufficiently achieved to become porous and the increase in air permeation resistance is reduced. In addition, along with phase-separation, the solidification of the resin configuring the modified porous layer is suppressed, penetration of the resin component configuring the modified porous layer into the polyolefin porous membrane can be achieved sufficiently. As a result, the sufficient 0° peel strength of the modified porous layers can be obtained. Meanwhile, the time of passage through the low-humidity zone is preferably not less than 3 seconds from the viewpoint of penetration of the fluorine-based resin component, and preferably not more than 20 seconds from the viewpoint of preventing the excessive solidification of the resin configuring the modified porous layer.

Next, the coated membrane is passed through the high-humidity zone for not less than 3 seconds but not more than 10 seconds. The high-humidity zone in the present invention is the zone controlled to the absolute humidity with the lower limit of 6 $g/m^3$, the preferable lower limit of 7 $g/m^3$ and the more preferable lower limit of 8 $g/m^3$, while with the upper limit of 25 $g/m^3$, the preferable upper limit of 17 $g/m^3$, and with the more preferable upper limit of 15 $g/m^3$. When the absolute humidity is within the preferable range described above, gelation (immobilization) can be sufficiently achieved, excessive penetration of the resin component configuring the modified porous layer into the polyolefin porous membrane may not occur, and the increase of the air permeation resistance can be reduced. Meanwhile, excessive solidification of the resin component and excessive reduction in penetration of the functionalized resin component into the polyolefin porous membrane can be prevented and sufficient 0° peel strength can be obtained.

Though the temperature condition is not particularly limited, as long as the absolute humidity is within the range described above for both the low-humidity zone and the high-humidity zone, it is preferable not less than 20° C., and not more than 50° C. from the viewpoint of energy savings.

Examples of the method of coating the varnish include a reverse roll coating method, a gravure coating method, a kiss coating method, a roll brush method, a spray coating method, an air knife coating method, a meyer-bar coating method, a pipe doctor method, a blade coating method and a die coating method, and these methods can be used alone or in combination thereof.

In the coagulating bath, the resin component and the particles are solidified in a three-dimensional mesh-like pattern. The time duration for immersing in the coagulating bath is preferably not less than 3 seconds. When the time duration for immersing in the coagulating bath is within the preferable range described above, the sufficient solidification of the resin component can be achieved. Though the upper limit is not particularly limited, 10 seconds is sufficient.

Furthermore, the porous membrane prior to the washing is immersed in the aqueous solution containing the solvent suitable for the functionalized resin in the amount from 1 to 20 wt. %, preferably from 5 to 15 wt. %, subsequently followed by the washing process using pure water and drying process using hot air of temperature not more than 100° C., and the final battery separator can be obtained.

For washing, general methods such as warming, ultrasonic irradiation or bubbling can be used. Furthermore, to maintain the concentration of each bath constant and improve washing efficiency, a method of removing a solution inside the porous membrane between baths is effective. Specific examples thereof include a method of forcing out a solution within a porous layer by air or an inert gas and a method of physically squeezing out a solution within a membrane by a guide roll.

It is desirable to store the battery separator of the present invention in a dry state. However, if storage in an absolute dry state is difficult, the battery separator is preferably subjected to a vacuum drying treatment at the temperature not more than 100° C. just before use.

The battery separator of the present invention can be used in nickel-metal hydride batteries, nickel-cadmium batteries, nickel-zinc batteries, silver-zinc batteries, rechargeable batteries such as lithium rechargeable batteries, lithium polymer rechargeable batteries and the like, plastic film capacitors, ceramic capacitors, electric double layer capacitors and the like as a separator, but is preferably used as a separator for lithium ion rechargeable batteries. The use of a lithium ion rechargeable battery as a separator is described below as an example.

In lithium ion rechargeable batteries, a positive electrode and a negative electrode are laminated with a separator interposed therebetween, and the separator contains an electrolytic solution (an electrolyte). The structure of the electrode is not particularly limited, and can be a known structure. For example, an electrode structure in which disc-shaped positive electrode and negative electrode are placed to face each other (coin type), an electrode structure in which planer positive electrodes and negative electrodes are alternately laminated (lamination type), an electrode structure in which band-shaped positive electrode and negative electrode are overlapped and wound (winding type) and the like can be employed.

The positive electrode comprises a current collector and a positive-electrode active material layer formed on the surface of the current collector and containing a positive-electrode active material capable of absorbing and desorbing lithium ions. Examples of the positive-electrode active material include inorganic compounds such as a transition metal oxide, a composite oxide of lithium and a transition metal (lithium composite oxide), a transition metal sulfide and the like. Examples of the transition metal include V, Mn, Fe, Co, Ni and the like. Preferred examples of the lithium composite oxide among the positive-electrode active materials include lithium nickel oxide, lithium cobalt oxide, lithium manganese oxide, a lamellar lithium composite oxide having an $\alpha$-$NaFeO_2$-type structure as matrix and the like.

The negative electrode includes a current collector and a negative-electrode active material layer formed on the surface of the current collector and containing a negative-electrode active material. Examples of the negative-electrode active material include carbonaceous materials such as natural graphite, artificial graphite, cokes, carbon black and the like. An electrolytic solution is obtained by dissolving a lithium salt in an organic solvent. Examples of the lithium salts include $LiClO_4$, $LiPF_6$, $LiAsF_6$, $LiSbF_6$, $LiBF_4$, $LiCF_3SO_3$, $LiN(CF_3SO_2)_2$, $LiC(CF_3SO_2)_3$, $Li_2B_{10}Cl_{10}$ LiN $(C_2F_5SO_2)_2$, $LiPF_4(CF_3)_2$, $LiPF_3(C_2F_5)_3$, a lithium salt of a lower aliphatic carboxylic acid, $LiAlCl_4$ and the like. These can be used alone or in combination of two or more kinds thereof. Examples of the organic solvent include an organic solvent having a high boiling point and a high dielectric constant such as ethylene carbonate, propylene carbonate, ethylmethyl carbonate, $\gamma$-butyrolactone and the like, and an organic solvent having a low boiling point and a low viscosity such as tetrahydrofuran, 2-methyltetrahydrofuran, dimethoxyethane, dioxolane, dimethyl carbonate, diethyl carbonate and the like. These can be used alone or in combination of two or more kinds thereof. Particularly, since an organic solvent having a high dielectric constant has a high viscosity, and an organic solvent having a low viscosity has a low dielectric constant, a mixture of each type of an organic solvent is preferably used.

Upon assembling a battery, the separator of the present invention can be impregnated with an electrolytic solution to provide the separator with ion permeability. Usually, an impregnation treatment is carried out by immersing a microporous membrane in an electrolytic solution at normal temperature. For example, when a cylindrical battery is assembled, first a positive electrode sheet, a separator (composite porous membrane), and a negative electrode sheet are laminated in this order, and the laminate is wound up from one end to form a winding-type electrode element. Then, this electrode element is inserted into a battery can, and impregnated with the electrolyte solution described above, followed by calking a battery cap having a safety valve and serving as a positive electrode terminal via a gasket. Thereby a battery can be obtained.

WORKING EXAMPLES

The present invention is described below using examples. However, the present invention is not limited by these examples in any way. Meanwhile, the measurement values in the examples are the values measured by the methods described below.

1. Number of Protrusions

The numbers and sizes of the protrusions were measured using a confocal microscope (HD100, manufactured by Lasertec Corporation), placed on a vibration isolation platform, after the light source thereof was stabilized.

Steps (1) On the surface of the polyethylene porous membrane obtained by working examples or comparative examples, the surface being the one with in contact with the chill-roll during the manufacturing, a square frame of 1 cm×1 cm in size was drawn with a fine-point permanent marker.

(2) The sample was placed on the sample stage with the surface with the drawn square up, and was fixed firmly to the sample stage using the electrostatic adhesion apparatus, the accessory of the confocal microscope.

(3) Using the objective lens with magnification of 5 times, a ring-shaped mark originating from a polyethylene spherulite was displayed on the monitor as a two-dimensional image (called REAL display for this microscope), and the position of the sample stage was adjusted so that the darkest part of the ring-shaped mark was approximately at the center of the monitor display. When two ring-shaped marks were connected, the stage was adjusted so that a point of contact was at the center of the monitor display. The protrusion height was measured only for the ring-shaped mark originating from the polyethylene spherulite with its major axes not less than 0.2 mm. The major axis length of a ring-shaped mark was measured by reading the length between two ends of the ring-shaped mark using a cursor on the two-dimensional image described above.

(4) Changing the objective lens to the one with magnification of 20 times, the reference height (called REF SET in this microscope) was set to the height when the focus was adjusted to the center area of the monitor display (so that the center area of the monitor display was displayed most brightly in this microscope).

(5) The measurement range in the height direction was set to 15 µm up and down relative to the reference height as 0 µm described above. Also, the scan time was 120 seconds, STEP transport distance was 0.1 µm/Step and the three-dimensional data was acquired.

(6) After the acquisition of the three-dimensional data, the image for data processing (Z image in this microscope) was displayed and smoothing process was applied (the conditions for smoothing are: the size of filter: 3×3, matrix type: SMOOTH3-0, the number of process: 1). In addition, plane correction was applied optionally in the plane correction window as necessary.

(7) The cursor was positioned horizontally on the position intersecting the highest protrusion in the image for data processing (the brightest position) and the cross-sectional profile corresponding to the cursor was displayed on the cross-sectional profile image.

(8) The protrusion size was measured by positioning the two vertical cursors to the inflection points at each side of the skirt of the protrusion in the cross-sectional profile image, and was defined as the distance between the two cursors.

(9) The protrusion height was measured by positioning the two horizontal cursors to the peak of the protrusion and the inflection points at each side of the skirt of the protrusion (the lower inflection point if the two inflection points at each side of the skirt of the protrusion were different in height), and was defined as the distance between two cursors.

(10) The operation described above was repeated inside the square of 1 cm×1 cm described above, the protrusions with size not less than 5 µm and not more than 50 µm, and with height not less than 0.5 µm and not more than 3.0 µm, were counted. Thus the number of the protrusions per 1 cm$^2$ was obtained and the average height of the protrusions was obtained.

2. 0° Peel Strength of Modified Porous Layer

FIG. 1 schematically illustrates the evaluation method. Reference numeral 1 denotes a laminated sample, 2 denotes a polyolefin porous membrane, 3 denotes a modified porous layer, 4 denotes a double-sided adhesive tape, 5 and 5' denote aluminum plates, and the arrow in the figure indicates the direction of tensile force. On the aluminum plate 5, which was 50 mm×25 mm in size and 0.5 mm in thickness, a piece of double-sided adhesive tape 4 (NW-K50, manufactured by Nichiban) of the same size thereof was adhered. The surface of the polyolefin porous membrane 2 side of the sample 1 (the battery separator), cut out in the size of 50 mm in width and 100 mm in length, was adhered on the aluminum plate 5, so that the 40 mm portion of the sample, measured from one of the 25 mm long edges of the aluminum plate 5, was overlapped and adhered together, while the protruded portion was cut out. Next, a double-sided adhesive tape was adhered on one side of the aluminum plate 5', 100 mm in length, 15 mm in width and 0.5 mm in thickness. And the 20 mm portion of the sample, measured from one of the 25 mm long edges of the aluminum plate 5, was overlapped and adhered together. Then, the aluminum plate 5 and the aluminum plate 5', which interposed the sample, were attached to the tensile tester (Autograph AGS-J1 kN, manufactured by Shimadzu Corp.), and the load was applied on the aluminum plate 5 and the aluminum plate 5' in parallel but in opposite directions, at a tensile velocity of 10 mm/min, and the strength at which the modified porous layer was delaminated was measured. The measurement was performed for any three points separated not less than 30 cm from each other in the longitudinal direction, and the average value thereof was recorded as the 0° peel strength of the modified porous layer.

3. Membrane Thickness

The membrane thickness was obtained by averaging measurements of 20 points using a contact-type membrane thickness meter (Litematic series 318, manufactured by Mitutoyo Corp.). An ultrahard spherical contact point of φ9.5 mm was used and measurements were done at 0.01 N measuring force.

4. Average Pore Diameter

The average pore diameter of the polyolefin porous membrane was measured by the following method. A sample was fixed on a measuring cell using a double-sided adhesive tape, on which platinum or gold was vacuum-deposited for several minutes, and the SEM measurement was conducted for the surface of the membrane under appropriate magnification. Any 10 points in an image obtained in SEM measurement were selected, an average value of pore diameters in the 10 points was determined as an average pore diameter of the sample.

5. Air Permeation Resistance

Using Gurley Type Densometer Model B manufactured by TESTER SANGYO CO., LTD, the polyolefin porous membrane or the battery separator, which was fixed between a clamping plate and an adapter plate so that no wrinkle occurred, was measured in accordance with JIS P-8117. A 10 cm-square sample was used, the measurement was performed for total of 5 points as measurement points, including the center and four corners of the sample. An average value of 5 points was used as an air permeation resistance [seconds/100 cc Air]. In the case where the length of one side of the sample was less than 10 cm, a value obtained by the measurement for 5 points at intervals of 5 cm may be used.

The increase in the air permeation resistance was obtained by the following formula.

The increase in the air permeation resistance [sec/100 cc Air]=(Y)−(X)

(X): The air permeation resistance of the polyolefin porous membrane [sec/100 cc Air]

(Y): The air permeation resistance of the battery separator [sec/100 cc Air]

6. Logarithm Viscosity

A solution obtained by dissolving 0.5 g of heat-resistant resin in 100 mL of NMP was measured at 25° C. using an Ubbelohde viscometer.

7. Melting Point

Using the differential scanning calorimetry (DSC), DSC6220 manufactured by SII NanoTechnology Corp., a resin sample of 5 mg was subjected to the temperature increase at the rate of temperature increase of 20° C./min under nitrogen atmosphere, and an apex of the melting peak observed during the temperature increase was determined as a melting point.

8. Glass Transition Temperature

A resin solution or a resin solution obtained by dissolving only a modified porous layer by immersing a battery separator in a good solvent was applied onto a PET film (E5001 manufactured by Toyobo Co., Ltd.) or a polypropylene film (Pyrene-OT (registered trademark) manufactured by Toyobo Co., Ltd.) using an applicator with an appropriate gap. A film obtained was peeled off after pre-drying at 120° C. for 10 minutes, then fixed in a metal frame having an appropriate size with a heat-resistant adhesive tape, and further dried in vacuum at 200° C. for 12 hours. The dried film was obtained. A sample having a width of 4 mm and a length of 21 mm was cut out from the dried film obtained, and the measurement was conducted using a dynamic viscoelasticity measuring apparatus (DVA-220; manufactured by IT Keisoku Seigyo Co. Ltd.) for the measurement length of 15 mm. The measurements were performed for the temperature from room temperature to 450° C., under the conditions of 110 Hz and a rate of temperature increase being 4° C./min. At the inflection point of storage modulus (E'), the glass transition temperature was defined as the intersection of the extrapolated line from the baseline below the glass transition temperature and the tangent at the maximum slope of the curve at the temperature equal to or greater than the inflection point.

9. Porosity

A 10 cm-square sample was prepared, and the sample volume ($cm^3$) and the mass (g) thereof were measured. The porosity (%) was calculated from the obtained results using the following formula.

Porosity=(1−mass/(resin density×sample volume))×100

10. Scratch Resistance

Both edges of the rolled battery separator obtained from the working examples and comparative examples were subjected to the slitting process. The slitting process was carried out by a slitter (Type WA177A, manufactured by Nishimura Seisakusho Corp.), under the condition of velocity of 20 m/min and tensile force of 50 N/100 mm. For the rolls which had contacts with the coated surface during the process, two hard chrome plated rolls (both were free rolls) were used. Then, while winding back the rolled battery separator after slit process, delaminated defects of the modified porous layer equal to or larger than 0.5 mm in major axes were counted under visual observation and observation using a magnifying glass of 10 times magnification with a scale (PEAK SCALE LUPEX10, manufactured by Tokai Sangyo Corp.). The results were evaluated according to the criteria below. The area of evaluation was 100 mm in width and 500 mm in length (If the width was less than 100 mm, the evaluation length was adjusted so that the total evaluation area was same).

Evaluation Criteria

Exceptionally Good: Not more than 10.

Good: From 11 to 30.

Fail: Not less than 31.

Working Example 1

A polyethylene composition (melting point 135° C.) was obtained by addition of 0.375 parts by weight of an antioxidant to 100 parts by weight of a composition (Mw/Mn=16.0), which comprises 2 wt. % of high molecular weight polyethylene (UHMWPE) with the weight average molecular weight of 2,000,000 and 98 wt. % of high density polyethylene (HDPE) with the weight average molecular weight of 350,000. 30 parts by weight of the polyethylene composition was introduced into a biaxial extruder. Through the side-feeder of the biaxial extruder, 70 parts by weight of liquid paraffin was supplied, melt and kneaded and the polyethylene resin solution was prepared inside the extruder. This was followed by extruding the polyethylene resin solution through the die disposed at the end of the extruder at 190° C. and at the extruding thickness of 825 μm, drawn by an 800 mm diameter chill-roll with internal cooling water temperature which was kept at 25° C. and the gel-like product was formed. During this operation, a piece of polyester doctor blade was placed in contact with the chill-roll at the point between the point the gel-like product departing from the chill-roll and the point polyethylene resin solution extruded from the die contacting with the chill-roll, parallel to the transverse direction of the gel-like product, and scraped off the liquid paraffin deposited on the chill-roll surface. Subsequently, the gel-like product was stretched by simultaneous biaxial stretching at the magnification of 5×5, under temperature control to obtain the desired air permeation resistance, and the stretched and molded material was obtained. The stretched and molded material obtained was washed with methylene chloride to extract and remove residual liquid paraffin, dried and a porous molded material was obtained. Then, the porous membrane was fixed on a tenter, shrieked by 10% only in TD (the transverse direction), and subjected to heat treatment at 90° C. for 3 seconds. The polyethylene porous membrane with the thickness of 16 μm, porosity of 45%, average pore diameter of 0.15 μm and air permeation resistance of 240 sec/100 cc Air was obtained.

Synthesis of Heat-Resistant Resin

In a four-necked flask equipped with a thermometer, a condenser and a nitrogen gas introducing tube, 1 mol of a trimellitic anhydride (TMA), 0.8 mol of o-tolidine diisocyanate (TODI), 0.2 mol of 2,4-tolidine diisocyanate (TDI) and 0.01 mol of potassium fluoride were introduced together with N-methyl-2-pyrrolidone to make up the solid concentration of 14%, and the mixture was stirred at 100° C. for 5 hours. Then the mixture was diluted with N-methyl-2-pyrrolidone to the solid concentration of 14% and a polyamideimide resin solution was synthesized. The logarithmic viscosity of the polyamideimide resin obtained was 1.35 dL/g and the glass transition temperature thereof was 320° C.

The polyamideimide resin solution, alumina particles of the average particle size of 0.5 μm, and N-methyl-2-pyrrolidone were mixed at the weight ratio of 26:34:40, respectively, introduced into a polypropylene container with zirconia oxide beads (trade name: Torayceram (registered trademark), manufactured by Toray Industries, size 0.5 mm), and dispersed for 6 hours using a paint-shaker (manufactured by Toyo Seiki Seisakusho). Then, the varnish (a) was obtained by filtering through a filter with filtering limit of 5 μm. The varnish was coated by blade coating on the side of the polyethylene porous membrane, which had been in contact with the chill-roll, passed through the low-humidity zone at temperature of 25° C. and the absolute humidity of 1.8 g/m³ for 8 seconds, followed by passing through the high-humidity zone at temperature of 25° C. and the absolute humidity of 12 g/m³ for 5 seconds. The treated membrane was immersed in the aqueous solution containing 5 wt. % of N-methyl-2-pyrrolidone for 10 seconds. Then the treated membrane was washed with pure water, dried by passing through the hot-air drier of temperature at 70° C., and the battery separator with final thickness of 18 μm was obtained.

Working Example 2

A battery separator was obtained in the same manner as Working Example 1, except changing the compounding ratio of the high molecular weight polyethylene (UHMWPE) with the weight average molecular weight of 2,000,000 and the high density polyethylene (HDPE) with the weight average molecular weight of 350,000 to 10:90 (wt. % ratio).

Working Example 3

A battery separator was obtained in the same manner as Working Example 1, except that the compounding ratio of the high molecular weight polyethylene (UHMWPE) with the weight average molecular weight of 2,000,000 and the high density polyethylene (HDPE) with the weight average molecular weight of 350,000 was changed to 20:80 (wt. % ratio).

Working Example 4

A battery separator was obtained in the same manner as Working Example 1, except that the compounding ratio of the high molecular weight polyethylene (UHMWPE) with the weight average molecular weight of 2,000,000 and the high density polyethylene (HDPE) with the weight average molecular weight of 350,000 was changed to 30:70 (wt. % ratio).

Working Example 5

A battery separator was obtained in the same manner as Working Example 1, except that the compounding ratio of the high molecular weight polyethylene (UHMWPE) with the weight average molecular weight of 2,000,000 and the high density polyethylene (HDPE) with the weight average molecular weight of 350,000 was changed to 40:60 (wt. % ratio).

Working Example 6

A battery separator was obtained in the same manner as Working Example 1, except that two pieces of polyester doctor blade were disposed to contact with the chill-roll with the interval of 20 mm.

Working Example 7

A battery separator was obtained in the same manner as Working Example 1, except that three pieces of polyester doctor blade were disposed to contact with the chill-roll with the interval of 20 mm from each other.

Working Example 8

The varnish (b) was obtained from polyamideimide resin solution (a), alumina particles with average particle size of 0.5 μm and N-methyl-2-pyrrolidone, with the compounding ratio of 17:43:40 (wt. % ratio), respectively. A battery separator was obtained in the same manner as Working Example 1, except that the varnish (b) was used.

Working Example 9

The varnish (c) was obtained from polyamideimide resin solution (a), alumina particles with average particle size of 0.5 μm and N-methyl-2-pyrrolidone, with the compounding ratio of 39:22:39 (wt. % ratio), respectively. A battery separator was obtained in the same manner as Working Example 1, except that the varnish (c) was used.

Working Example 10

A battery separator was obtained in the same manner as Working Example 1, except that the internal cooling water temperature of the chill-roll was kept at 35° C.

Working Example 11

A battery separator with the final thickness of 22 μm was obtained in the same manner as Working Example 1, except that the polyethylene porous membrane with the thickness of 20 μm was obtained by adjusting the extruding volume of the polyethylene solution.

Working Example 12

A battery separator with the final thickness of 14 μm was obtained in the same manner as Working Example 1, except that the polyethylene porous membrane with the thickness of 12 μm was obtained by adjusting the extruding volume of the polyethylene solution.

Working Example 13

A battery separator with the final thickness of 11 μm was obtained in the same manner as Working Example 1, except that the polyethylene porous membrane with the thickness of 9 μm was obtained by adjusting the extruding volume of the polyethylene solution.

Working Example 14

A battery separator was obtained in the same manner as Working Example 1, except that the 26 parts by weight of polyethylene composition was introduced into the biaxial extruder and 74 parts by weight of liquid paraffin was supplied through the side-feeder of the biaxial extruder.

Working Example 15

A battery separator was obtained in the same manner as Working Example 1, except that the 35 parts by weight of polyethylene composition was introduced into the biaxial extruder and 65 parts by weight of liquid paraffin was supplied through the side-feeder of the biaxial extruder.

Working Example 16

A varnish (d) was obtained by replacing the alumina particles with cross-linked polymeric particles (polymethylmethacrylate-based polymeric particles (EPOSTER (registered trademark) MA1002, manufactured by Nippon Shokubai Co. Ltd., average particle size 2.5 μm)) and the compounding ratio of 35:10:55 (wt. % ratio) for cross-linked polymeric particles, N-methyl-2-pyrrolidone. A battery separator was obtained in the same manner as Working Example 1, except that the varnish (d) was used.

Working Example 17

A fluorine-based resin solution (KF polymer (registered trademark) #1120 (polyvinylidene fluoride (melting point 175° C., 12% N-methylpyrrolidone solution) manufactured by Kureha Corp.), alumina particles of average particle size of 0.5 μm and N-methyl-2-pyrrolidone were mixed at the weight ratio of 31:34:45, respectively. The mixture was introduced into a polypropylene container with zirconium oxide beads (Torayceram (registered trademark), manufactured by Toray Industries, size 0.5 mm) and dispersed for 6 hours using a paint-shaker (manufactured by Toyo Seiki Seisakusho). Then, the varnish (e) was obtained by filtering through a filter with filtering limit of 5 μm. A battery separator was obtained in the same manner as Working Example 1, except that the varnish (e) was used.

Comparative Example 1

A battery separator was obtained in the same manner as Working Example 1, except that the liquid paraffin deposited on the chill-roll was not scraped off by the doctor blade upon obtaining the gel-like product by cooling the polyethylene resin solution extruded from the die on the chill-roll.

Comparative Example 2

A battery separator was obtained in the same manner as Working Example 1, except that the polyethylene composition (melting point 135° C.) obtained by adding 0.375 parts by weight of an antioxidant to 100 parts by weight of the composition (Mw/Mn=16.0) comprising 100 wt. % of high density polyethylene (HDPE) with weight average molecular weight of 350,000 was used.

Comparative Example 3

A battery separator was obtained in the same manner as Working Example 1, except that the internal cooling water temperature of the chill-roll was kept at 0° C. and the doctor blade was not used.

Comparative Example 4

A battery separator was obtained in the same manner as Working Example 1, except that the polyethylene resin solution was immersed in water kept at 25° C. for 1 minute instead of the cooling polyethylene resin solution extruded from the die by the chill-roll.

Comparative Example 5

50 parts by weight of the polyethylene composition used in the Working Example 1 was introduced into the biaxial extruder, 50 parts by weight of liquid paraffin was supplied through the side-feeder of the biaxial extruder, melt and kneaded and the polyethylene solution was prepared in the extruder. Extrusion of the polyethylene solution was tried but the homogeneous membrane was not obtained.

Comparative Example 6

A battery separator was obtained in the same manner as Working Example 1, except that the internal cooling water temperature of the chill-roll was kept at 50° C.

The characteristics of the polyolefin porous membranes and the battery separators obtained from the Working Examples 1 to 17 and Comparative Examples 1 to 6 are listed in Table 1.

TABLE 1

| | UHMWPE (wt. %) | HDPE (wt. %) | Resin Concentration (Parts By Weight) | Chill-Roll Temperature (°C.) | Scraping off the Forming Solvent (Number of Blades) | Varnish | Polyolefin Porous Membrane Thickness (μm) | Polyolefin Porous Membrane Air Permeation Resistance (X) (sec/100 cc Air) | Battery Separator Air Permeation Resistance (Y) (sec/100 cc Air) | Air Permeation Resistance Increase [(Y) − (X)] (sec/100 cc Air) | Number of Protrusion (number of protrusions/cm²) | Average Protrusions Height (μm) | 0° Peel Strength (N/15 mm) | Scratch Resistance |
|---|---|---|---|---|---|---|---|---|---|---|---|---|---|---|
| Working Example 1 | 2 | 98 | 30 | 25 | 1 | a | 16 | 240 | 288 | 48 | 14 | 2.8 | 120 | Exceptionally Good |
| Working Example 2 | 10 | 90 | 30 | 25 | 1 | a | 16 | 252 | 290 | 38 | 17 | 1.1 | 118 | Exceptionally Good |
| Working Example 3 | 20 | 80 | 30 | 25 | 1 | a | 16 | 260 | 298 | 38 | 19 | 0.8 | 115 | Exceptionally Good |
| Working Example 4 | 30 | 70 | 30 | 25 | 1 | a | 16 | 273 | 305 | 32 | 42 | 0.6 | 118 | Exceptionally Good |
| Working Example 5 | 40 | 60 | 30 | 25 | 1 | a | 16 | 95 | 132 | 37 | 126 | 0.5 | 104 | Exceptionally Good |
| Working Example 6 | 2 | 98 | 30 | 25 | 2 | a | 16 | 240 | 288 | 48 | 16 | 2.9 | 126 | Exceptionally Good |
| Working Example 7 | 2 | 98 | 30 | 25 | 3 | a | 16 | 240 | 290 | 50 | 17 | 2.9 | 129 | Exceptionally Good |
| Working Example 8 | 2 | 98 | 30 | 25 | 1 | b | 16 | 240 | 293 | 53 | 14 | 2.8 | 115 | Exceptionally Good |
| Working Example 9 | 2 | 98 | 30 | 25 | 1 | c | 16 | 240 | 287 | 47 | 14 | 2.8 | 124 | Exceptionally Good |
| Working Example 10 | 2 | 98 | 30 | 25 | 1 | a | 16 | 240 | 332 | 92 | 12 | 2.6 | 118 | Exceptionally Good |
| Working Example 11 | 2 | 98 | 30 | 35 | 1 | a | 20 | 250 | 300 | 50 | 12 | 2.9 | 118 | Exceptionally Good |
| Working Example 12 | 2 | 98 | 30 | 25 | 1 | a | 12 | 170 | 218 | 48 | 18 | 1.0 | 116 | Exceptionally Good |
| Working Example 13 | 2 | 98 | 30 | 25 | 1 | a | 9 | 220 | 261 | 41 | 20 | 0.6 | 110 | Exceptionally Good |
| Working Example 14 | 2 | 98 | 26 | 25 | 1 | a | 16 | 228 | 270 | 42 | 11 | 2.5 | 118 | Exceptionally Good |
| Working Example 15 | 2 | 98 | 35 | 25 | 1 | a | 16 | 250 | 295 | 45 | 19 | 2.9 | 122 | Exceptionally Good |
| Working Example 16 | 2 | 98 | 30 | 25 | 1 | d | 16 | 245 | 295 | 50 | 14 | 2.8 | 110 | Exceptionally Good |
| Working Example 17 | 2 | 98 | 30 | 25 | 1 | e | 16 | 243 | 298 | 55 | 14 | 2.8 | 125 | Exceptionally Good |
| Comparative Example 1 | 0 | 100 | 30 | 25 | 0 | a | 16 | 239 | 287 | 48 | 0 | — | 95 | Fail |
| Comparative Example 2 | 2 | 98 | 30 | 25 | 1 | a | 16 | 238 | 280 | 42 | 0 | — | 93 | Fail |
| Comparative Example 3 | 2 | 98 | 30 | 0 | 0 | a | 16 | 240 | 287 | 47 | 0 | — | 91 | Fail |

TABLE 1-continued

| | UHMWPE (wt. %) | HDPE (wt. %) | Resin Concentration (Parts By Weight) | Chill-Roll Temperature (°C) | Scraping off the Forming Solvent (Number of Blades) | Varnish | Polyolefin Porous Membrane Thickness (μm) | Polyolefin Porous Membrane Air Permeation Resistance (X) (sec/100 cc Air) | Battery Separator Air Permeation Resistance (Y) (sec/100 cc Air) | Air Permeation Resistance Increase [(Y) − (X)] (sec/100 cc Air) | Number of Protrusion (number of protrusions/cm²) | Average Protrusions Height (μm) | 0° Peel Strength (N/15 mm) | Scratch Resistance |
|---|---|---|---|---|---|---|---|---|---|---|---|---|---|---|
| Comparative Example 4 | 2 | 98 | 30 | 25° C. (Water Bath) | — | a | 16 | 241 | 288 | 47 | 2 | 0.6 | 98 | Good |
| Comparative Example 5 | 2 | 98 | 50 | — | — | — | — | — | — | — | — | — | — | — |
| Comparative Example 6 | 2 | 98 | 30 | 50 | 1 | a | 16 | 241 | 292 | 51 | 0 | — | 92 | Fail |

REFERENCE SIGNS LIST

1 Battery separator
2 Polyolefin porous membrane
3 Modified porous layer
4 Double-sided adhesive tape
5 Aluminum plate
6 Polyethylene spherulite nucleus
7 Die
8 Polyolefin resin solution
9 Chill-roll
10 Doctor blade
11 Gel-like product

What is claimed is:

1. A polyolefin porous membrane comprising:
a plurality of protrusions of polyolefin formed at locations corresponding to crystallized spherulites, wherein the protrusions have a size (W) of 5 μm≤W≤50 μm and a height (H) of 0.5 μm≤H, wherein the protrusions are disposed on one side of the polyolefin porous membrane with a density of at least 3/cm$^2$ and at most 200/cm$^2$, and wherein the polyolefin porous membrane has a thickness of at most 20 μm.

2. A battery separator, comprising the polyolefin porous membrane of claim 1.

3. The battery separator according to claim 2, wherein the porous layer comprises at least one of polyamideimide resin, polyimide resin, and polyamide resin.

4. The battery separator according to claim 2, wherein the porous layer comprises fluorine-based resin.

5. The battery separator according to claim 2, wherein the porous layer comprises at least one of inorganic particles and cross-linked polymer particles.

6. The battery separator according to claim 2, wherein the thickness of the polyolefin porous membrane is at most 16 μm.

7. The battery separator according to claim 2, wherein the thickness of the polyolefin porous membrane is at most 12 μm.

* * * * *